F. ZIZKA.
LOADING CART.
APPLICATION FILED APR. 20, 1912.
1,044,841.
Patented Nov. 19, 1912.
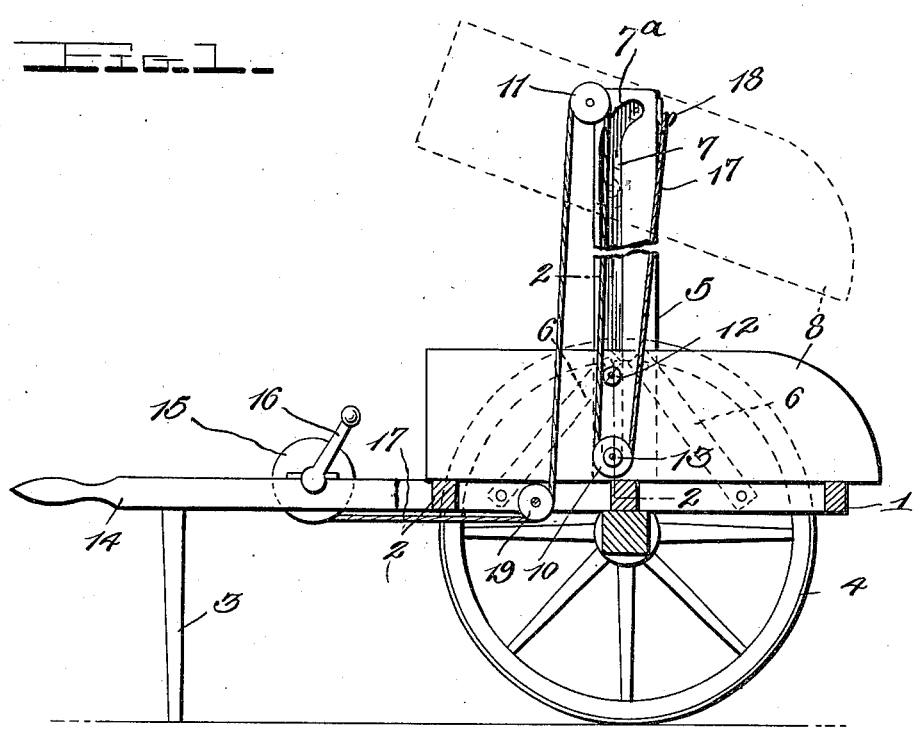
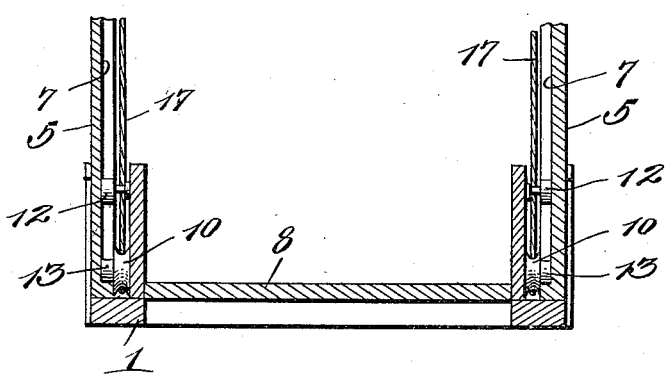
Witnesses
Chas. L. Griesbauer.
A. B. Norton.
Inventor
Frank Zizka
By Watson E. Coleman
Attorney
COLUMBIA PLANOGRAPH CO., WASHINGTON, D. C.

UNITED STATES PATENT OFFICE.

FRANK ZIZKA, OF LANKIN, NORTH DAKOTA.

LOADING-CART.

1,044,841.  Specification of Letters Patent.  Patented Nov. 19, 1912.

Application filed April 20, 1912. Serial No. 692,090.

*To all whom it may concern:*

Be it known that I, FRANK ZIZKA, a citizen of the United States, residing at Lankin, in the county of Walsh and State of North Dakota, have invented certain new and useful Improvements in Loading-Carts, of which the following is a specification, reference being had to the accompanying drawings.

This invention relates to loading carts and has particular reference to a cart adapted for the collection of manure and its transference to a wagon for hauling away.

The object of the invention is to provide a simple, inexpensive and efficient means for such handling and transference, easily operable by one man to effect the loading of the wagon from the cart without undue effort.

The invention is thus outlined and as hereinafter claimed will be readily understood from the following detailed description taken in connection with the accompanying illustrative drawings, wherein—

Figure 1 is a side elevation partly in section, showing in full lines the cart in normal condition, and indicating in dotted lines the dumping position of the parts; and Fig. 2 is a section on the line 2—2 of Fig. 1.

In the drawing wherein similar reference numerals indicate corresponding parts throughout, the numeral 1 designates a cart frame provided with the transverse brace 2 and legs 3 and carried by the ground wheels 4. Rising from each side of the frame are standards 5 rigidly supported in a vertical position by the braces 6 and provided on their inner faces with ways 7 curved at their upper ends as indicated at 7ª.

A basket or box 8 is loosely mounted upon the cart frame between the standards as shown, said box being provided on opposite sides with pulleys 10. Upon the upper ends of the standards are mounted similar pulleys 11. On the sides of the box are vertically spaced guide rollers 12 and 13 adapted to travel in the ways 7.

It will be noted that the lower guide rollers 13 are mounted upon the same axles as are the pulleys 10, which latter serve to hold the guide rollers within the longitudinal guide grooves.

Suitably journaled in the handle bars 14 of the cart is a winch 15 provided with an operating handle 16. Ropes 17 are attached at one end to the hooks 18 carried upon the upper ends of the standards 5 and from thence the ropes extend downwardly around the pulleys 10, thence upwardly around the pulleys 11 and finally downwardly and rearwardly around the pulleys 19 which are journaled on the opposite sides of the frame, the opposite ends of the two ropes being wound upon the winch 15.

When the cart is loaded by means of shovels, forks or otherwise, in the barn or the like, it is drawn in loaded condition alongside of the wagon to which its load is to be transferred and in that position by the operation of the winch 15 by means of the handle 16, the box 8 with the load is elevated between the standards 5 and 6 to a point above the level of the wagon and is then automatically tilted by the upper guide rollers 12 entering the curved upper portions 7ª of the ways 7, the load being thereby automatically discharged.

Having thus described the invention, I claim:

In a cart, the combination of a box loosely mounted thereon, standards extending upwardly from the cart frame on each side of the box, each standard being provided on its inner face with a longitudinal guide groove deflected laterally at its upper terminal portion, a pair of vertically spaced guide rollers mounted upon each side of the box and adapted to travel within said grooves, axles supporting the guide rollers, pulleys mounted upon the lower of said axles and serving to hold the guide rollers which are also mounted thereon, within the longitudinal guide grooves, and ropes passing over said pulleys and connected to the top of the standards and to the cart whereby the box may be elevated.

In testimony whereof I hereunto affix my signature in the presence of two witnesses.

FRANK ZIZKA.

Witnesses:
J. T. PRACHEK,
O. A. REGGLAND.

Copies of this patent may be obtained for five cents each, by addressing the "Commissioner of Patents, Washington, D. C."